US009040753B2

(12) United States Patent
Chen

(10) Patent No.: US 9,040,753 B2
(45) Date of Patent: May 26, 2015

(54) POLYMER RECOVERY PROCESS IN THE FILTRATION OF POLYETHER POLYOLS

(75) Inventor: Glen Jih-Chao Chen, Houston, TX (US)

(73) Assignee: INVISTA North America S.a.r.l., Wilmington, DE (US)

( * ) Notice: Subject to any disclaimer, the term of this patent is extended or adjusted under 35 U.S.C. 154(b) by 0 days.

(21) Appl. No.: 14/233,014

(22) PCT Filed: Jul. 19, 2012

(86) PCT No.: PCT/US2012/047375
§ 371 (c)(1),
(2), (4) Date: Mar. 20, 2014

(87) PCT Pub. No.: WO2013/013028
PCT Pub. Date: Jan. 24, 2013

(65) Prior Publication Data
US 2014/0213828 A1  Jul. 31, 2014

Related U.S. Application Data

(60) Provisional application No. 61/509,496, filed on Jul. 19, 2011.

(30) Foreign Application Priority Data

Oct. 28, 2011  (CN) .......................... 2011 1 0333758

(51) Int. Cl.
*C08G 65/30* (2006.01)
(52) U.S. Cl.
CPC ..................................... *C08G 65/30* (2013.01)
(58) Field of Classification Search
None
See application file for complete search history.

(56) References Cited

U.S. PATENT DOCUMENTS

| 4,120,903 A | 10/1978 | Pruckmayr et al. |
| 4,137,396 A | 1/1979 | Louvar et al. |
| 4,306,943 A | 12/1981 | Mori et al. |
| 4,460,796 A | 7/1984 | Mueller |
| 4,985,551 A | 1/1991 | Perry et al. |
| 5,410,093 A | 4/1995 | Dorai |
| 6,037,381 A | 3/2000 | Beer et al. |

FOREIGN PATENT DOCUMENTS

| EP | 0050181 A1 | 4/1982 |
| WO | 9522573 A1 | 8/1995 |

OTHER PUBLICATIONS

Baharlou, Simin, International Preliminary Report on Patentability dated Jan. 21, 2014, for International Application No. PCT/US2012/047375, 7 pages.
Kositza, Matthias, International Search Report dated Sep. 19, 2012, for International Application No. PCT/US2012/047375, 2 pages.

*Primary Examiner* — Brian J Davis
(74) *Attorney, Agent, or Firm* — Ni Yan

(57) ABSTRACT

A filtration method is disclosed for recovering purified polyether polyol comprising the steps of providing an aqueous solution of a polyether polyol containing an alkali metal catalyst residual formed from a transesterification process utilizing an alkali metal catalyst, contacting the aqueous solution with a stoichiometric excess of magnesium sulfate, magnesium sulfite or a combination thereof to form a second aqueous solution, wherein said stoichiometric excess is based on the amount of said alkali metal catalyst residual. Water is removed from the second aqueous solution at a temperature above a set limit of said polyether polyol to produce a dehydrated slurry containing a polyether polyol phase substantially free of residual alkali metal and a precipitated solid phase comprising sulfate and/or sulfite salts of the alkali metal catalyst, magnesium hydroxide, and excess magnesium sulfate and/or sulfite, wherein the particle size distribution of said precipitated solid phase is controlled to minimize the amount of particles therein that are smaller than 3 microns. The dehydrated slurry is then passed through a filtration system to separate the polyether polyol phase from the precipitated solid phase.

7 Claims, 4 Drawing Sheets

POLYMER RECOVERY PROCESS IN THE FILTRATION OF POLYETHER POLYOLS

CROSS-REFERENCE TO RELATED APPLICATION

This application claims benefit of priority from U.S. Provisional Application No. 61/509,496, filed 19 Jul. 2011 and Chinese Patent Application No. 201110333758.3, filed 28 Oct. 2011. This application hereby incorporates both applications in their entirety.

FIELD OF THE INVENTION

This disclosure relates to a process for producing polyether polyols. More specifically, it relates to a process for improving the filtration of residual metal catalyst to recover a purified polyether polyol product.

BACKGROUND OF THE INVENTION

Homopolymers of THF, also known as polytetramethylene ether glycols (PTMEG), are well known for use in spandex, polyurethanes and other elastomers. These homopolymers impart superior mechanical and dynamic properties to polyurethane elastomers, fibers and other forms of final products. As discussed in U.S. Pat. No. 4,120,903, the polymerization process of utilizing tetrahydrofuran (THF) to manufacture polytetramethylene ether glycol (PTMEG) by passing through the intermediate PTMEA (i.e., PTMEG diacetate) has been commercially practiced since about 1997. The process involves a ring-opening of THF using perfluorosulfonic acid ionomer resin as the first step in the production of the PTMEA. The most commonly known process to convert PTMEA to PTMEG is by a conventional transesterification using an alkali metal catalyst, such as sodium methylate. This method results in a residual catalyst which needs to be removed from the PTMEG product.

There are many known processes for removing the remaining alkali metal catalyst from the PTMEG product after the transesterification step. Some of these known processes are disclosed in U.S. Pat. Nos. 4,137,396, 4,985,551, 4,460,796, 4,306,943 and 6,037,381. U.S. Pat. No. 5,410,093, herein incorporated in its entirety by reference, relates to a method wherein the alkali metal catalyst is neutralized in an aqueous media in the presence of an excess amount of magnesium sulfate. The inorganic co-products of this neutralization can include sodium sulfate and magnesium hydroxide. The various inorganic solids present in PTMEG are then separated in a chamber plate filter press operation. Prior to filtration, the water must be removed from the solution containing the residual catalyst.

It is desirable to increase the filter feed rate and filter throughput between shutdowns and cleaning to improve the catalyst removal process. Moreover, maintaining the pressure drop across the filtration system is a common problem that affects both the filter feed rate and filter throughput between shutdowns. It is well known that an increased pressure drop can result in a decreased feed rate into the filtration system. This will also lead to a decreased throughput between shut down and cleaning of the filtration system.

Consequently, there is a need for a method of maintaining a desired pressure drop across the filtration system to increase the filtration feed rate and increase the throughput between shut down and cleaning of the filtration system, in a process for recovering a polyether polyol product.

SUMMARY OF THE INVENTION

Disclosed is a method of maintaining a desired pressure drop across a filtration system to increase the filtration feed rate and increase the throughput between shut down and cleaning of the filtration system, in a process for recovering a polyether polyol product.

The pressure drop through the filters is maintained at a desired level by controlling the particle size distribution of the particles exiting a dryer system, prior to being fed into the filtration system. In one embodiment of the present invention, the particle size distribution is controlled by adjusting the recirculation valve position for the dryer circulation valve, which controls the pressure drop in the dryer system and allows for recirculation of particles in the dryer system.

An embodiment comprises the steps of:
(a) providing an aqueous solution of a polyether polyol containing an alkali metal catalyst residual formed from a transesterification process utilizing an alkali metal catalyst;
(b) contacting the aqueous solution of a polyether polyol of step (a) with a stoichiometric excess of magnesium sulfate, magnesium sulfite or a combination thereof to form a second aqueous solution, wherein said stoichiometric excess is based on the amount of said alkali metal catalyst residual;
(c) removing water from said second aqueous solution of step (b) at a temperature in range from 125° C. to 145° C. to produce a dehydrated slurry containing a polyether polyol phase with a residual alkali metal content below 1 ppm and a precipitated solid phase comprising sulfate and/or sulfite salts of the alkali metal catalyst, magnesium hydroxide, and excess magnesium sulfate and/or sulfite, wherein the particle size distribution of said precipitated solid phase is controlled to minimize the amount of particles therein that are smaller than 3 microns;
(d) passing the dehydrated slurry of step (c) through a filtration system to separate the polyether polyol phase from the precipitated solid phase; and
(e) recovering polyether polyol from the separated polyether polyol phase.

In another embodiment, removing water from said second aqueous solution of step (b) is accomplished in a dryer recirculation system, wherein the dryer recirculation system comprises a primary dryer and a primary dryer heater, and optionally a secondary dryer and secondary dryer heater.

In another embodiment, controlling the particle size distribution of the precipitated solid phase of step (c) is accomplished by adjusting the pressure drop in the dryer recirculation system, and wherein the feed rate across the filtration system of step (d) is determined by the particle size distribution.

In another embodiment, the pressure drop in the dryer recirculation system is optimized to minimize the amount of particles in said precipitated solid phase to be smaller than 3 microns.

In another embodiment, the amount of particles in said precipitated solid phase that are smaller than 3 microns is below 15% by volume.

In another embodiment, the dryer recirculation system includes a recirculation valve, said recirculation valve position adjustable to control the pressure drop in the dryer recirculation system.

In another embodiment, the position of said recirculation valve is determined based on the molecular weight of the polyether polyol from step (a).

In another embodiment, the alkali metal catalyst is selected from the group consisting of alkali metal hydroxide, alkali metal alkoxide, alkaline earth metal hydroxide, alkaline earth metal alkoxide, and combinations thereof, and said precipitated solid phase comprises magnesium hydroxide, sulfate salts of said alkali metal catalyst, and excess magnesium sulfate, magnesium sulfite or mixture thereof.

In another embodiment, the alkali metal catalyst is sodium methylate and said precipitated solid phase comprises magnesium hydroxide and sodium sulfate.

In another embodiment, the polyether polyol has a molecular weight ranging from 650 to 3000 Daltons.

In another embodiment, the polyether polyol is poly(tetramethylene ether) glycol or a copolymer thereof.

DETAILED DESCRIPTION OF THE INVENTION

Disclosed is a method of maintaining a desired pressure drop across a filtration system by controlling the particle size distribution of the particles exiting a dryer system, prior to being fed into the filtration system. In one embodiment of the present invention, the particle size distribution is controlled by adjusting the valve position for the dryer recirculation valve, which controls the recirculation of particles in the dryer All patents, patent applications, test procedures, priority documents, articles, publications, manuals, and other documents cited herein are fully incorporated by reference to the extent such disclosure is not inconsistent with this invention and for all jurisdictions in which such incorporation is permitted.

The term "polymerization", as used herein, unless otherwise indicated, includes the term "copolymerization" within its meaning.

The term "PTMEG", as used herein, unless otherwise indicated, means poly(tetramethylene ether glycol). PTMEG is also known as polyoxybutylene glycol.

The term "THF", as used herein, unless otherwise indicated, means tetrahydrofuran and includes within its meaning alkyl substituted tetrahydrofuran capable of copolymerizing with THF, for example 2-methyltetrahydrofuran, 3-methyltetrahydrofuran, and 3-ethyltetrahydrofuran.

Figure 1:
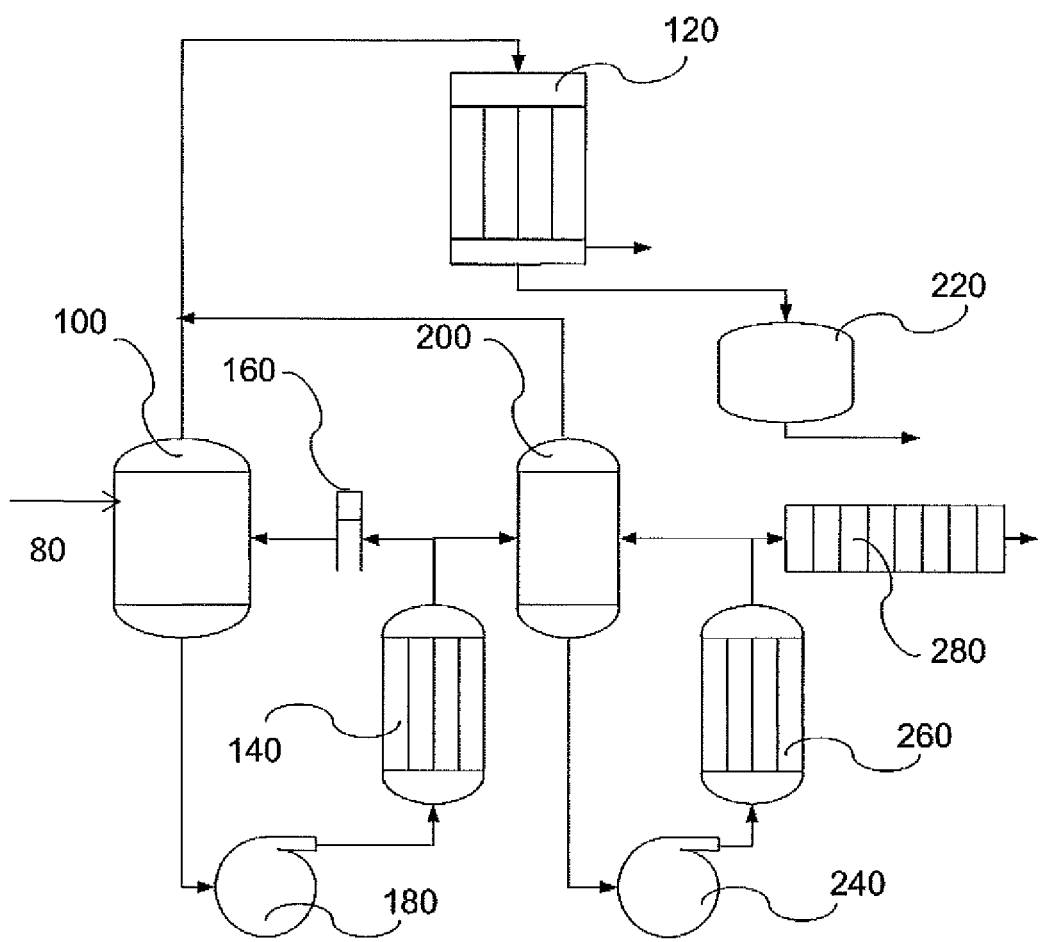
FIG. 1 is a process diagram depicting the prior art.

The process from U.S. Pat. No. 5,410,093, with a fixed recirculation valve (160), is shown in FIG. 1. In the PTMEG manufacturing process, a polymer stream (not shown) containing an alkali metal catalyst residual formed from a transesterification process utilizing an alkali metal catalyst is contacted with a stoichiometric excess of magnesium sulfate, magnesium sulfite or a combination thereof and water in a mixer (not shown) to form an aqueous polymer stream (80). The aqueous polymer stream (80) carries with it solid $Mg(OH)_2$, dissolved $MgSO_4$ and $Na_2SO_4$ which is fed into the Primary Dryer (100) recirculation stream. These inorganic salts are formed in the neutralization reaction in the preceding steps in the manufacturing process.

These inorganic salts must be removed sufficiently from the product prior to storage as finished product to satisfy customer requirements. The drying and filtration of these salts are achieved using a 2-stage dryer system (100 & 200) followed by plate and frame cloth filters (280).

The drying is achieved using the primary dryer (100), heater (140) which is under vacuum, and recirculation back to the primary dryer allowing the stream to achieve a steady state prior to feeding it to the filter presses (280). Further drying is achieved using a secondary dryer (200) along with the vacuum condenser (120) to remove traces of water prior to filtration. Typically, the dryers (100,200) operate at a temperature range between 125° C. and 145° C. and a vacuum pressure range of between about 40 to about 100 mmHg absolute. In a particular embodiment of the present invention, the target temperature for the process is 130° C.

As the heated recirculation stream enters the primary dryer through the fixed recirculation valve (160), water is flashed off and vaporizes out of the bulk circulation stream. The dissolved salts in the stream come out of the solution to form solid crystals of known distribution, which are then filtered out in the filter presses (280). We have discovered that the crystal formation and the distribution of solids in the polymer have a significant effect on the effectiveness of the filter presses.

Figure 2:
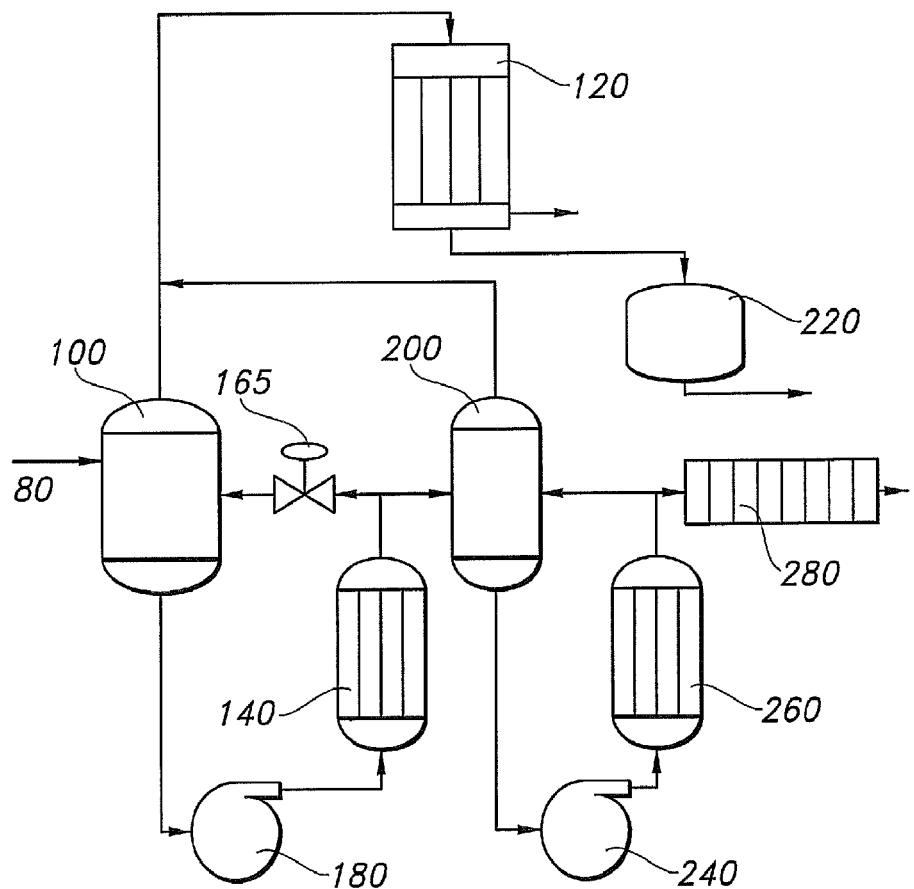
FIG. 2 is a process diagram for an embodiment of the present invention.

As shown in FIG. 2, a particular embodiment of the present invention is shown and will be herein described. The process for filtering out the inorganic solids from the product consists of the following processing units:

The product containing dissolved inorganic solids of solid $Mg(OH)_2$, dissolved $MgSO_4$ and $Na_2SO_4$ is passed through the primary dryer (100) in a circulation loop containing a circulation pump (180) heater (140) and a restricting orifice. A partial product stream is drawn off to the secondary dryer (200). This 2-stage drying process ensures that moisture is removed completely prior to entering the filter press (280). A vacuum is drawn from the dryer through a condenser (120) to a hold up tank (220). A similar circulation loop is installed around the secondary dryer with its own pump (240) and a heater (260) to remove the residual moisture. This secondary system is also connected to the same vacuum system with the condenser to capture the condensation in a tank (220). A partial stream is drawn from this loop as a forward feed to the filter presses (280).

The inventor has discovered the filter press (280) operation is very sensitive to the recirculation valve (165) position for products with molecular weight in the range of 1600 Daltons or higher, as opposed to lower molecular weight grades that are more forgiving to the valve position as measured by the crystal formation. For higher molecular weight grades, it has also been discovered that reducing the recirculation valve (165) position results in fewer small particle size crystals being formed in the dryer. This has been found to significantly alter the particle size distribution and the pressure drop was reduced across the filter press (280) at the given flux rate. It has been found that maintaining the particle size above 3 microns has led to optimal filter operation. At optimal operating conditions, the reduced filter pressure drop allows a higher filter feed rate, thus increasing the production capability. This also increased total cumulative throughput between shut down and cleaning of the filtration system.

The position of the recirculation valve aids in maintaining the particle size distribution by controlling the pressure drop through the dryer system. The rheology of the molten polymer circulating through the dryer system undergoes tremendous shear when passing through the recirculation valve. This results in changes in particle size of the suspended salts as they come out of solution. The resulting particle size distribution is dependent on the sheer energy as a function of the pressure drop in the dryer recirculation loop, which can be adjusted by varying the recirculation valve (165) position as a function of the polymer grade. In an embodiment of the present invention, optimal filter operation is achieved when the particle size distribution of the crystals leaving the dryer is maintained so that less than 15% by volume of the particles are below 3 microns in size.

An adjustable recirculation valve (165) also allows for different grades of polymer to be made in the same manufacturing facility with the molecular weight ranging from 650 to 3,000 Daltons. Various recirculation valve (165) positions were tried for different grades to find the optimum setting. The standard equation used to predict the pressure drop for cake filtration is:

$$\Delta P = k \epsilon_{(Mc)} \mu M_c u / A$$

Where: $\Delta P$=pressure drop across filter cake
u=flowrate of polymer
$\mu$=viscosity of polymer (function of temperature and MW)
$M_c$=mass of filter cake (can be approximated by cumulative pounds to the press)
$\epsilon_{(Mc)}$=porosity as a function of filter cake mass, particle size etc.
A=filtration area
u/A=flux rate
k=constant that is a function of particle size, density and volume of filtrate The combination term $k \epsilon_{(Mc)}$ is considered to be the specific cake resistance for the filter cake. This value will be dependent on the solids generated in the manufacturing process and the selected filter aid. The molecular weight and the temperature of the polymer are accounted for in the viscosity term. At the same temperature and flowrate, increasing the molecular weight will increase the viscosity, thereby increasing the pressure drop. This pressure drop increase is independent of filter aid type. The flowrate of the polymer and the filtration area dictate the overall flux. A filter run is normally terminated when the pressure drop reaches the maximum limit of the feed pump (240) or a process limit set based on safety considerations.

EXAMPLES

The following Examples disclose a process and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

Example 1

Figure 3:
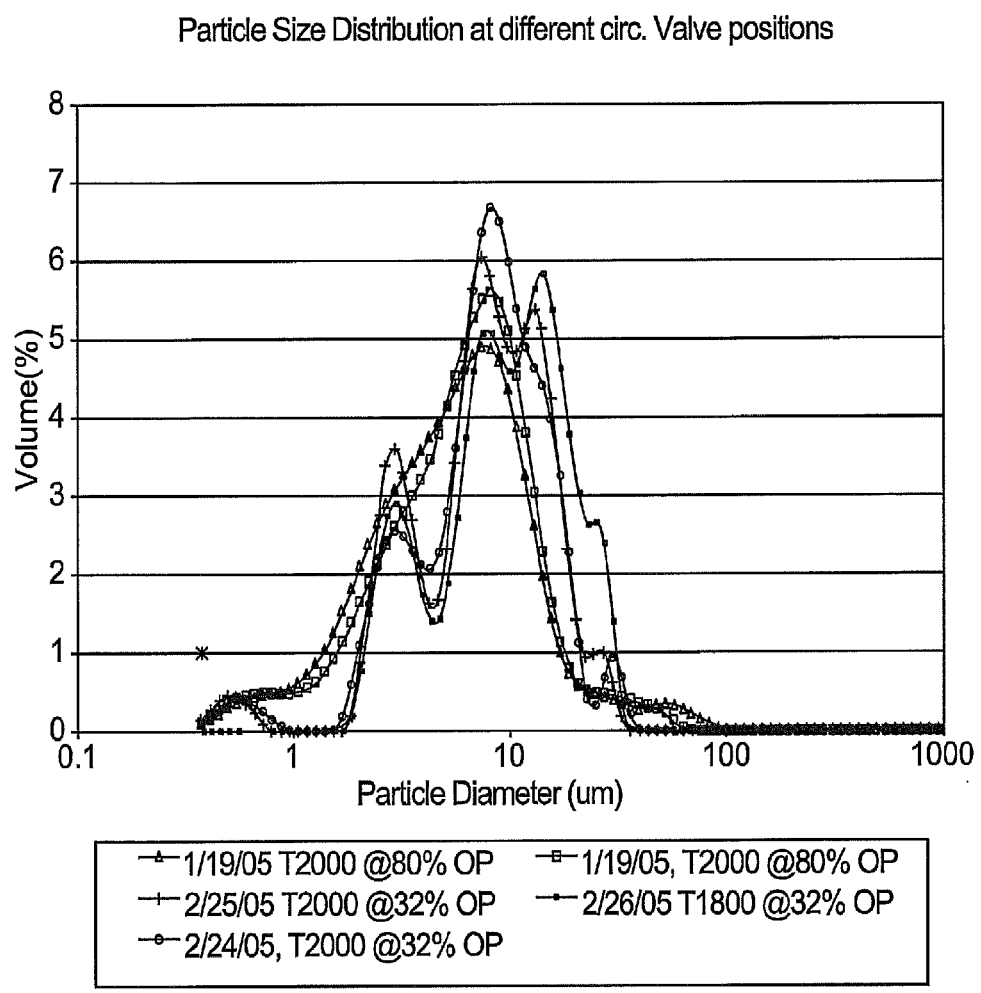
FIG. 3 is a chart showing the particle size distribution at different recirculation valve positions.

Example 1 considers data taken using samples of 1000-2000 grade Terathane® PTMEG taken from the INVISTA LaPorte site. The dryer (100) was operated at a temperature aim of 130° C. and a vacuum pressure range of 40-100 mmHg absolute. FIG. 3 shows the particle size distribution from dryer (100) with circulation valve (165) position set at 80% and 32% (the circulation valve position may be set at a valve output (OP) between 0-100%). The particle size distribution was determined using a Beckman-Coulter LS230 particle size analyzer with small volume module. Patterns of particle size distribution were found to be different as the circulation valve position changed. At the reduced valve (165) position of 32%, the amount of particles that are below 3 microns is reduced from about 25% to about 15% by volume. Consequently, it is shown that by varying the circulation valve position, the amount of particles above 3 microns can be increased.

Example 2

Figure 4:
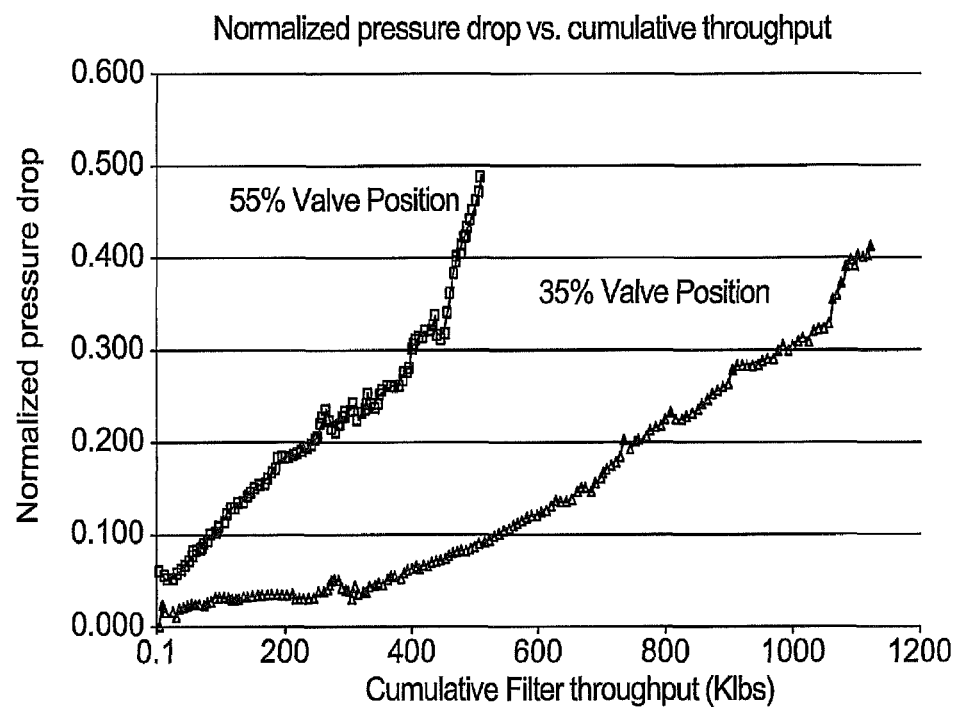
FIG. 4 is a chart showing the filter press throughput at different recirculation valve positions.

Data for this Example was taken from INVISTA LaPorte site, wherein the dryer (100) was operated at a temperature aim of 130° C. and a vacuum pressure range of 40-100 mmHg absolute. FIG. 4 shows the "Normalized pressure drop ($\Delta P/(u/A)/\mu$)" vs. "cumulated press throughput" with circulation valve positions of 55% and 35% respectively for high MW polymer (MW>1600 Daltons). When the circulation valve position is set at 35%, the maximum filter feed rate increases from about 7,200 pph to about 9,000 pph, or 25% capacity increase. As a result, varying the circulation valve position the cumulative filter press total throughput increases from about 500,000 lbs. to about 1,100,000 lbs or more than double the filter press life.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'".

While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

What is claimed:

1. A filtration method for recovering purified polyether polyol comprising the steps of:
   (a) providing an aqueous solution of a polyether polyol containing an alkali metal catalyst residual formed from a transesterification process utilizing an alkali metal catalyst;
   (b) contacting the aqueous solution of a polyether polyol of step (a) with a stoichiometric excess of magnesium sulfate, magnesium sulfite or a combination thereof to form a second aqueous solution, wherein said stoichiometric excess is based on the amount of said alkali metal catalyst residual;
   (c) removing water from said second aqueous solution of step (b) at a temperature in range from 125° C. to 145° C. to produce a dehydrated slurry containing a polyether polyol phase with a residual alkali metal content below 1 ppm and a precipitated solid phase comprising sulfate and/or sulfite salts of the alkali metal catalyst, magnesium hydroxide, and excess magnesium sulfate and/or sulfite, wherein the particle size distribution of said precipitated solid phase is controlled to minimize the amount of particles therein that are smaller than 3 microns, wherein the amount of particles in said precipitated solid phase that are smaller than 3 microns is below 15% by volume;

(d) passing the dehydrated slurry of step (c) through a filtration system to separate the polyether polyol phase from the precipitated solid phase; and (e) recovering polyether polyol from the separated polyether polyol phase, wherein said polyether polyol is poly(tetramethylene ether) glycol or a copolymer thereof;

wherein removing water from said second aqueous solution of step (b) is accomplished in a dryer recirculation system; and wherein controlling the particle size distribution of the precipitated solid phase of step (c) is accomplished by adjusting the pressure drop in the dryer recirculation system, and wherein the feed rate across the filtration system of step (d) is determined by the particle size distribution.

2. The method of claim 1 wherein the pressure drop in the dryer recirculation system is optimized to minimize the amount of particles in said precipitated solid phase to be smaller than 3 microns.

3. A filtration method for recovering purified polyether polyol comprising the steps of:

(a) providing an aqueous solution of a polyether polyol containing an alkali metal catalyst residual formed from a transesterification process utilizing an alkali metal catalyst;

(b) contacting the aqueous solution of a polyether polyol of step (a) with a stoichiometric excess of magnesium sulfate, magnesium sulfite or a combination thereof to form a second aqueous solution, wherein said stoichiometric excess is based on the amount of said alkali metal catalyst residual;

(c) removing water from said second aqueous solution of step (b) at a temperature in range from 125° C. to 145° C. to produce a dehydrated slurry containing a polyether polyol phase with a residual alkali metal content below 1 ppm and a precipitated solid phase comprising sulfate and/or sulfite salts of the alkali metal catalyst, magnesium hydroxide, and excess magnesium sulfate and/or sulfite, wherein the particle size distribution of said precipitated solid phase is controlled to minimize the amount of particles therein that are smaller than 3 microns, wherein the amount of particles in said precipitated solid phase that are smaller than 3 microns is below 15% by volume;

(d) passing the dehydrated slurry of step (c) through a filtration system to separate the polyether polyol phase from the precipitated solid phase; and (e) recovering polyether polyol from the separated polyether polyol phase, wherein said polyether polyol is poly(tetramethylene ether) glycol or a copolymer thereof;

wherein removing water from said second aqueous solution of step (b) is accomplished in a dryer recirculation system; and wherein controlling the particle size distribution of the precipitated solid phase of step (c) is accomplished by adjusting the pressure drop in the dryer recirculation system, and wherein the feed rate across the filtration system of step (d) is determined by the particle size distribution;

wherein the pressure drop in the dryer recirculation system is optimized to minimize the amount of particles in said precipitated solid phase to be smaller than 3 microns; and wherein said dryer recirculation system includes a recirculation valve, said recirculation valve position adjustable to control the pressure drop in the dryer recirculation system.

4. The method of claim 3 wherein the position of said recirculation valve is determined based on the molecular weight of the polyether polyol from step (a).

5. The method of claim 1 wherein said alkali metal catalyst is selected from the group consisting of alkali metal hydroxide, alkali metal alkoxide, alkaline earth metal hydroxide, alkaline earth metal alkoxide, and combinations thereof, and said precipitated solid phase comprises magnesium hydroxide, sulfate salts of said alkali metal catalyst, and excess magnesium sulfate, magnesium sulfite or mixture thereof.

6. The method of claim 1 wherein said alkali metal catalyst is sodium methylate and said precipitated solid phase comprises magnesium hydroxide and sodium sulfate.

7. The method of claim 1 wherein said polyether polyol has a molecular weight ranging from 650 to 3000 Daltons.

* * * * *